US008660060B2

(12) United States Patent
Sanayei

(10) Patent No.: US 8,660,060 B2
(45) Date of Patent: Feb. 25, 2014

(54) SYSTEM AND METHOD FOR COMMUNICATIONS USING SPATIAL MULTIPLEXING WITH INCOMPLETE CHANNEL INFORMATION

(75) Inventor: Shahab Sanayei, Richardson, TX (US)

(73) Assignee: FutureWei Technologies, Inc., Plano, TX (US)

( * ) Notice: Subject to any disclaimer, the term of this patent is extended or adjusted under 35 U.S.C. 154(b) by 820 days.

(21) Appl. No.: 12/731,991

(22) Filed: Mar. 25, 2010

(65) Prior Publication Data

US 2010/0246494 A1 Sep. 30, 2010

Related U.S. Application Data

(60) Provisional application No. 61/163,762, filed on Mar. 26, 2009.

(51) Int. Cl.
*H04B 7/212* (2006.01)

(52) U.S. Cl.
USPC .......................................... 370/321

(58) Field of Classification Search
USPC ......... 375/260, 130, 142, 147, 148, 267, 316, 375/346, 349; 342/373; 370/321, 316; 455/562.1
See application file for complete search history.

(56) References Cited

U.S. PATENT DOCUMENTS

| 5,542,101 | A | 7/1996 | Pal |
| 7,274,330 | B2 | 9/2007 | Lee |
| 2005/0041751 | A1 | 2/2005 | Nir et al. |
| 2006/0014491 | A1* | 1/2006 | Cleveland ..................... 455/17 |
| 2007/0071141 | A1 | 3/2007 | Perrins |
| 2008/0192849 | A1 | 8/2008 | Kim et al. |
| 2008/0225960 | A1* | 9/2008 | Kotecha et al. ............... 375/259 |
| 2009/0322613 | A1* | 12/2009 | Bala et al. .................... 342/373 |

FOREIGN PATENT DOCUMENTS

| CN | 1736053 A | 2/2006 |
| EP | 0654915 A | 5/1995 |

OTHER PUBLICATIONS

International Search Report and Written Opinion of Patent Cooperation Treaty (PCT), International Application No. PCT/CN2010/071341, date of mailing Jul. 8, 2010, Applicant Huawei Technologies Co., Ltd., 11 pages.

Baumgartner, T., et al., "Performance of Downlink Beam Switching for UMTS FDD in the Presence of Angular Spread," IEEE, 2002, pp. 851-855.

Liao, W-J, et al., "A Novel Beam Switching Antenna using RF Switches," IEEE, 2007, pp. 5865-5868.

(Continued)

*Primary Examiner* — Raj Jain
(74) *Attorney, Agent, or Firm* — Slater & Matsil, L.L.P.

(57) ABSTRACT

A system and method for communications using spatial multiplexing with incomplete channel information are provided. A method for wireless communications includes receiving, at a controller, a reference signal transmitted by a communications device, computing channel statistics based on the received reference signal, computing a first beamforming vector and a second beamforming vector, and transmitting information to the communications device. The reference signal being transmitted using a subset of antennas used for data reception at the communications device, and the controller and the communications device utilize cross-polarized antennas. The computing being based on the channel statistics, the transmitting uses the first beamforming vector and the second beamforming vector, the first beamforming vector precodes information for a first antenna at the communications device, and the second beamforming vector precodes information for a second antenna at the communications device.

23 Claims, 7 Drawing Sheets

(56) References Cited

OTHER PUBLICATIONS

Love, D. J., "On the Probability of Error of Antenna-Subset Selection With Space-Time Block Codes," IEEE Transactions on Communications, vol. 53, No. 11, Nov. 2005, pp. 1799-1803.

Pedersen, K. I., et al., "Application and Performance of Downlink Beamforming Techniques in UMTS," IEEE Communications Magazine, Oct. 2003, pp. 134-143.

Sanayei, S., et al., "Antenna Selection in MIMO Systems," Adaptive Antennas and MIMO Systems for Wireless Communications, IEEE Communications Magazine, Oct. 2004, pp. 68-73.

Zeng, X. N., et al., "Performance Bounds for Space-Time Block Codes with Antenna Selection," IEEE, Jun. 27-Jul. 2, 2004, p. 339.

Qualcomm Proposal for 3GPP2 Physical Layer, Denver CO, May 2006, 115 pages.

QTDD Performance Report 2, C802.20-05188, in IEEE 802.20 Working Group on Mobile Broadband Wireless Access (http://ieee802.org/20/), Nov. 15, 2011, 56 pages.

Shafi M. et al."Polarized MIMO channel in 3D: Models, Measurements and Mutual Information,", IEEE Journal on Selected Areas in Communications, vol. 24, No. 3, Mar. 2006, 14 pages.

Telatar, E., "Capacity of multi-antenna Gaussian channels," European Transactions on Telecommunications, vol. 10, pp. 585-595, Nov./Dec. 1999.

\* cited by examiner

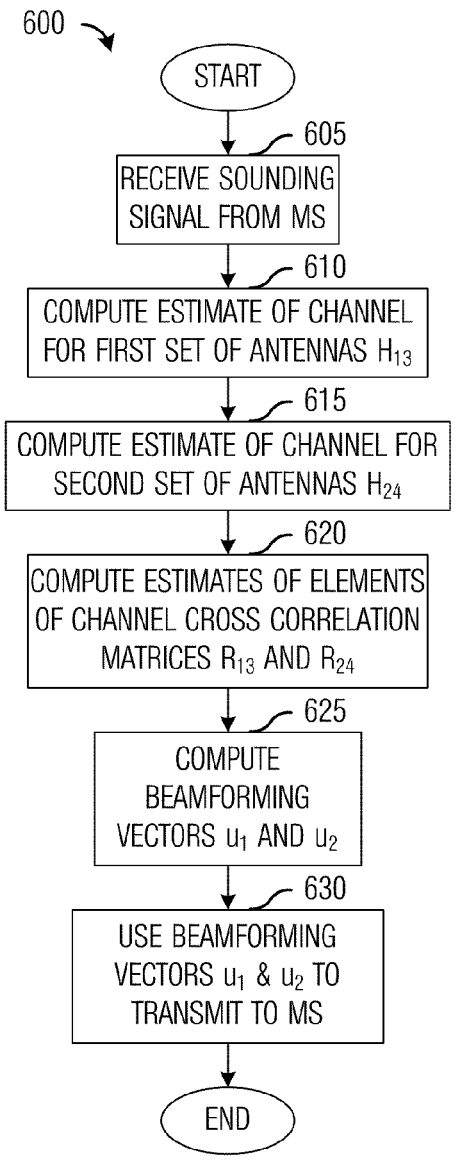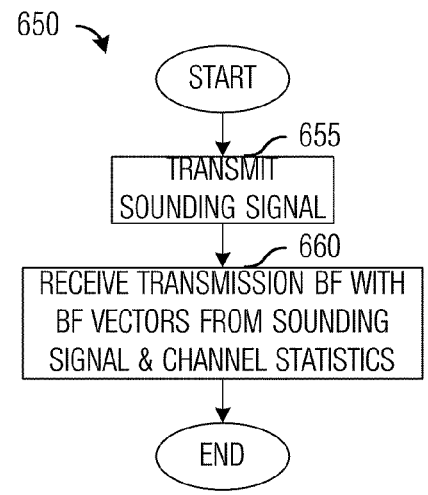
Fig. 6a
Fig. 6b

SYSTEM AND METHOD FOR COMMUNICATIONS USING SPATIAL MULTIPLEXING WITH INCOMPLETE CHANNEL INFORMATION

This application claims the benefit of U.S. Provisional Application No. 61/163,762, filed on Mar. 26, 2009, entitled "System and Method for Spatial Multiplexing with Incomplete Channel Information in Cross-Polarized Antenna Array Systems," which application is hereby incorporated herein by reference.

TECHNICAL FIELD

The present invention relates generally to wireless communications, and more particularly to a system and method for communications using spatial multiplexing with incomplete channel information.

BACKGROUND

Generally, in wireless communications systems knowledge of downlink (DL) channel information may be essential for efficient beamforming to one or more users. The transmission of information to two or more users is commonly referred to as spatial multiplexing.

DL channel information may be provided by a receiver (e.g., a mobile station, a user, a terminal, a User Equipment, and so on) to a transmitter (e.g., a base station, a NodeB, an enhanced NodeB, a base terminal station, a relay station, and so forth) over a feedback channel. In frequency division duplexing (FDD) communications systems, the receiver may estimate or measure the DL channel and then feed the DL channel information back to the transmitter. The DL channel information may be feedback in its raw form, a quantized version (a codeword from a codebook known by both the receiver and the transmitter), an index to the quantized version (e.g., an index to the codeword from the codebook), or so on.

In time-division duplexing (TDD) communications systems, when calibrated antenna arrays are used, uplink (UL) and DL channels may be almost identical. Channel reciprocity may be a commonly used term to describe this phenomenon. Since the UL and DL channels may be almost identical, it may be possible for a receiver to transmit a sounding reference signal in an UL channel to a transmitter, the transmitter may measure the UL channel using the sounding reference signal, and the transmitter may use the information about the UL channel in its DL transmission to the receiver.

However, in practical communications systems, the receiver may not have an equal number of receive radio frequency (RF) chains and transmit RF chains. For example, a receiver may have two receive antennas but only one transmit antenna, i.e., a first of the two receive antennas may also transmit, but a second of the two receive antennas may only receive. Therefore, only a portion of the channel state information is available through sounding reference signal measurement, providing incomplete channel state information (I-CSI).

SUMMARY

These technical advantages are generally achieved, by embodiments of a system and method for communications using spatial multiplexing with incomplete channel information.

In accordance with an embodiment, a method for wireless communications is provided. The method includes receiving, at a controller, a reference signal transmitted by a communications device, computing channel statistics based on the received reference signal, computing a first beamforming vector and a second beamforming vector, and transmitting information to the communications device. The reference signal being transmitted using a subset of antennas used for data reception at the communications device, and the controller and the communications device utilize cross-polarized antennas. The computing being based on the channel statistics, the transmitting uses the first beamforming vector and the second beamforming vector, the first beamforming vector precodes information for a first antenna at the communications device, and the second beamforming vector precodes information for a second antenna at the communications device.

In accordance with another embodiment, a method for wireless communications is provided. The method includes transmitting a reference signal using a subset of antennas used for receiving information to a controller, and receiving information from the controller. The information is precoded using a first beamforming vector and a second beamforming vector, the information precoded by the first beamforming vector is received by a first antenna, the information precoded by the second beamforming vector is received by a second antenna, and the first beamforming vector and the second beamforming vector are computed from estimates of statistical channel information.

In accordance with another embodiment, a communications controller is provided. The communications controller includes a receiver, a beamforming vector compute unit coupled to the receiver, and a beamforming unit coupled to the receiver and to the beamforming vector compute unit. The receiver receives a reference signal transmitted by a communications device. The communications device transmits with a subset of antennas used for receiving information. The beamforming vector compute unit computes beamforming vectors for a communications device based on estimates of elements of correlation matrices for antennas in the subset of antennas based on a transmission of the reference signal by the communications device, and the beamforming unit precodes data to be transmitted to the communications device with the beamforming vectors computed by the beamforming vector compute unit for the communications device.

An advantage of an embodiment is that available channel state information and channel statistical information are used to compute missing or incomplete channel state information to enable spatial multiplexing with beamforming vectors in a MIMO wireless communications system with communications devices using cross-polarized antenna arrays.

A further advantage of an embodiment is that channel statistical information is used to select the beamforming vectors, thereby yielding better beamforming performance than selecting beamforming vectors without having instantaneous channel information in a random manner.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the embodiments, and the advantages thereof, reference is now made to the following descriptions taken in conjunction with the accompanying drawings, in which:

FIG. 6a is a flow diagram of BS operations in communicating with incomplete channel state information;

FIG. 6b is a flow diagram of MS operations in communicating with incomplete channel state information;

DETAILED DESCRIPTION OF ILLUSTRATIVE EMBODIMENTS

The making and using of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The embodiments will be described in a specific context, namely a WiMAX compliant communications system with mobile stations (MSs) having more receive antennas than transmit antennas and antennas at both the MS and base stations (BSs) arranged in a cross-polarized configuration. The invention may also be applied, however, to other communications systems that support spatial multiplexing where user equipments (UEs) have more receive antennas than transmit antennas, such as Third Generation Partnership Project (3GPP) Long Term Evolution (LTE), 3GPP LTE-Advanced, and so forth, with antennas arranged in a cross-polarized configuration.

Figure 1:
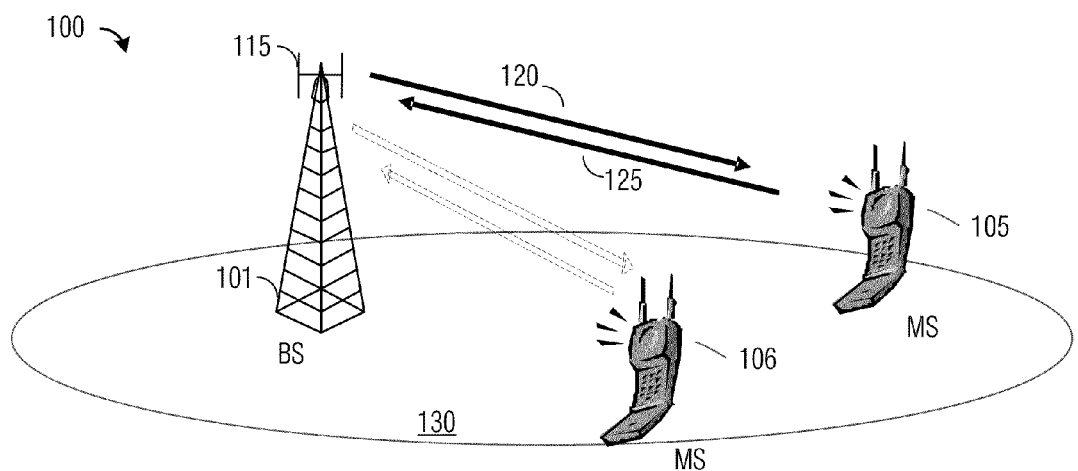
FIG. 1 is a diagram of a wireless communications system.

FIG. 1 illustrates a wireless communications system 100. Wireless communications system 100 includes a BS 101 and a MS 105 and MS 106, which may be mobile or fixed. BS 101 and MS 105 and MS 106 may communicate using wireless communications. BS 101 has a plurality of transmit antennas 115, while MS 105 and MS 106 may have one or more receive antennas. BS 101 sends control information and data to MS 105 through downlink (DL) channel 120, while MS 105 sends control information and data to BS 101 through uplink (UL) channel 125. BS 101 and MS 106 may also communicate over similar channels.

MS 105 may send control information on UL channel 125 to improve the quality of the transmission on DL channel 120. BS 101 may send control information on DL channel 120 for the purpose of improving the quality of uplink channel 125. A cell 130 is a conventional term for the coverage area of BS 101. It is generally understood that in wireless communications system 100 there may be multiple cells corresponding to multiple BSs, as well as multiple MSs.

In general, spatial multiplexing allows for the transmitting of parallel data streams in wireless communications systems equipped with an array of cross-polarized antenna pairs. It is also known that in a multiple-input, multiple output (MIMO) link, the knowledge of the channel (whether instantaneous or statistical) can help increase the capacity of the MIMO link. When full instantaneous knowledge of the channel matrix is available at the transmitter, the right singular vectors of the channel matrix provide the optimal directions for transmitting parallel data streams. When power control is also employed among transmitted parallel streams, the method is known as the water-filling solution which provides the maximum achievable capacity when the complete instantaneous channel is known. Additionally, when statistical knowledge of the channel is available, the eigen directions of the spatial correlation matrix are known to be the optimal directions for parallel data transmission in MIMO channels.

BS 101 may exploit spatial multiplexing to increase data rate in wireless communications system 100. For example, although DL channel 120 between BS 101 and MS 105 is shown as a single channel, DL channel 120 may actually be multiple parallel data streams with each parallel data stream transmitted by a transmit antenna in plurality of transmit antennas 115. Similarly, BS 101 may also use spatial multiplexing in its transmissions to MS 106.

Figure 2:
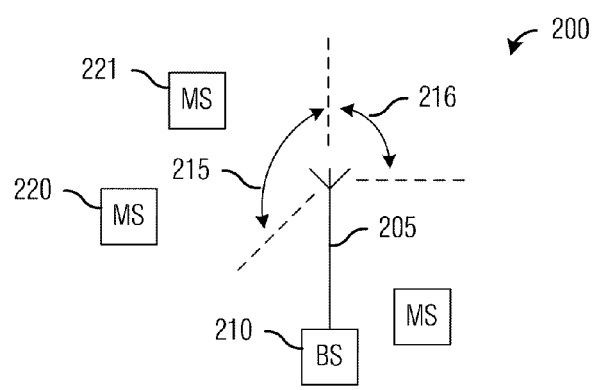
FIG. 2 is a diagram of a portion of a wireless communications system.

FIG. 2 illustrates a portion of a wireless communications system 200. As shown in FIG. 2, an antenna 205, such as an antenna of a BS 210 operating in the wireless communications system 200, may be partitioned into three sectors, such as sector 215 and sector 216. Although shown in FIG. 2 as a single antenna, the antenna 205 may consist of three individual antennas, with one antenna per sector. The BS 210 may be capable of transmitting separate signals within the different sectors. Furthermore, the BS 210 may spatially divide the signals to multiple MSs, such as MS 220 and MS 221, within their respective sectors.

The use of polarized antennas is a popular technique for realizing a large antenna when there are restrictions on the physical size of the base-station. In such a case, the antennas are placed in two planes (a V-plane and an H-plane, for example) and at each plane, the antennas form a uniform linear array.

Figure 3A:
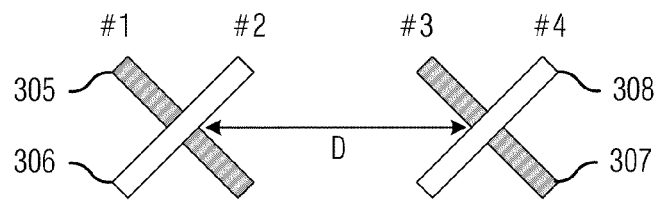
FIG. 3a is a diagram of an antenna configuration of a BS of a wireless communications system.

FIG. 3a illustrates an antenna configuration of a BS of a wireless communications system. The BS includes four antennas numbered, antennas 305 through 308. Antennas 305 through 308 are referred to as antennas #1 through #4, respectively. Antennas 305 and 307 may have a similar polarization, while antennas 306 and 308 may have a different polarization. Antennas 305 and 306 may be spaced a distance D apart from antennas 307 and 308. Antennas 305 through 308 may be used in both transmit and receive modes.

Figure 3B:
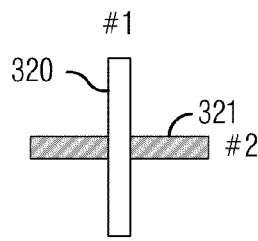
FIG. 3b is a diagram of an antenna configuration of a MS of a wireless communications system.

FIG. 3b illustrates an antenna configuration of a MS of a wireless communications system. The MS includes two antennas, antennas 320 and 321. Antenna 320 is also referred to as antenna #1 and antenna 321 as antenna #2. Antennas 320 and 321 may have different polarizations. Both antennas 320 and 321 may be used in a receive mode by the MS, but only one antenna (antenna 320, for example) may be used to transmit. Although the antennas of the MS may have different polarizations, operability of the embodiments presented herein does not rely on the polarization of antennas of the MS.

Figure 4:
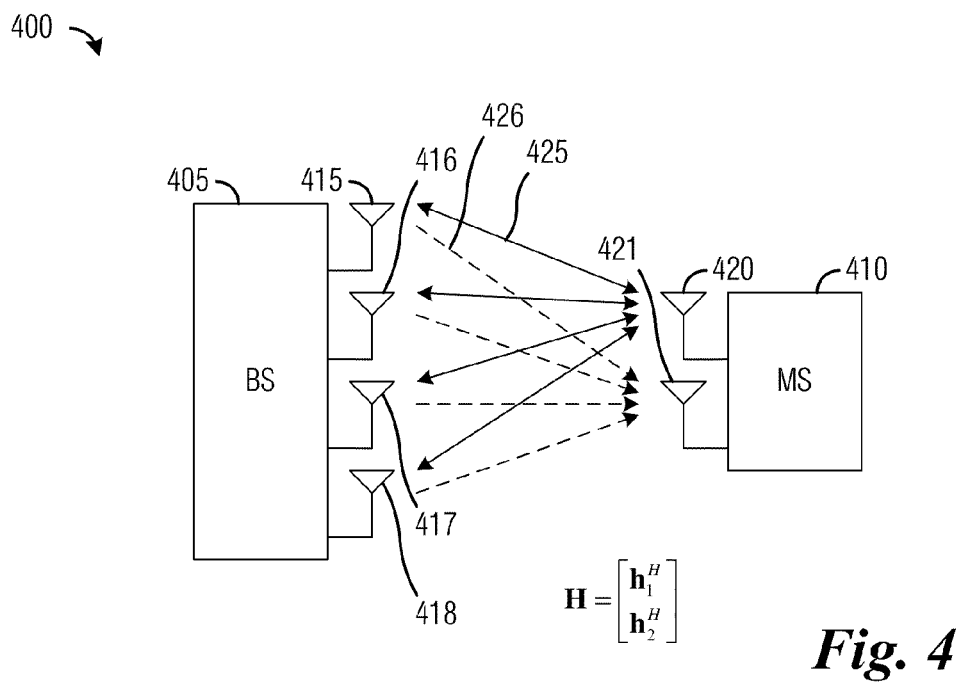
FIG. 4 is a diagram of a model of communications between a BS and a MS.

FIG. 4 illustrates a model 400 of communications between a BS 405 and a MS 410. For discussion purposes of model 400, let BS 405 have $N_t$ antennas and MS 410 have $N_r$ antennas. Furthermore, let all $N_t$ antennas at BS 405 be operable as both transmit and receive antennas, but for all $N_r$ antennas at MS 410 only a subset (e.g., one) may operate as a transmit antenna while all may operate as receive antennas.

As shown in FIG. 4, BS 405 may have multiple antennas, such as antennas 415 through 418 that may operate as both receive and transmit antennas. Antennas 415 through 418 may also be referred to as antennas #1 through #4. BS 405 is shown in FIG. 4 as having four antennas ($N_t$=4). However, a BS may have any number of antennas, such as one, two, three, four, five, six, and so forth. Therefore, the illustrative example of BS 405 having four transmit/receive antennas should not be construed as being limiting to either the scope or the spirit of the embodiments.

Also as shown in FIG. 4, MS 410 may have multiple antennas ($N_r$=2), such as antennas 420 and 421. Antenna 420 may also be referred to as antenna #1 and antenna 421 may also be referred to as antenna #2. In order to simplify MS design, it may often be the case that a MS may not have the same number of transmit and receive antennas. For example, antenna 420 of MS 410 may be used as both a transmit antenna and a receive antenna, while antenna 421 may only be used as a receive antenna.

Arrowed lines represent channels between BS 405 and MS 410. For example, arrowed line 425 represents a bi-directional (both DL and UL channels) channel between antenna 415 and antenna 420, while dotted arrowed line 426 represents a uni-directional (only DL channel) channel between antenna 415 and antenna 421.

Consider a flat fading MIMO model expressible as $$Y = H \cdot x + n,$$

where $H \in C^{N_r \times N_t}$ is a MIMO channel response. Let $$H = \begin{bmatrix} h_1^H \\ h_2^H \end{bmatrix}$$

be a downlink channel matrix where $h_1$ and $h_2$ are the uplink responses corresponding to antennas 420 and 421 of MS 410 (antennas #1 and #2), respectively. Assume that only antenna 420 of MS 410 can send sounding reference signals, therefore $h_1$ is known at BS 405. Since antenna 421 of MS 410 cannot send sounding reference signals, $h_2$ is unknown. However, a correlation of $h_2$ is known at BS 405 and is expressible as $E[h_2 h_2^H] = R$. Furthermore, let $\hat{h}_1 = h_1 + e_1$ be an estimate of $h_1$, where $e_1$ is an estimation error. It is desired to find beamforming directions $w_1$ and $w_2$ to send two independent data streams so that overall throughput is maximized.

Since the rank of the downlink channel is two, it is possible to transmit up to two independent streams, expressible as $$x = \sqrt{P_1} \cdot s_1 \cdot u_1 + \sqrt{P_2} \cdot s_2 \cdot u_2,$$

such that $P = P_1 + P_2$, where $S_1$ and $s_2$ are transmitted symbols in directions $w_1$ and $w_2$, respectively, and $E[|s_1|^2] = E[|s_2|^2] = 1$.

A model of the signal may be expressed as $$Y = H \cdot F \cdot s + n,$$

where $$F = [u_1 \ u_2] \cdot \begin{bmatrix} \sqrt{P_1} & 0 \\ 0 & \sqrt{P_2} \end{bmatrix}$$

is a precoder matrix and $$s = \begin{bmatrix} s_1 \\ s_2 \end{bmatrix}$$

is a vector of transmitted symbols. According to an embodiment, $(u_1, u_2)$ and $(P_1, P_2)$ should be found so that overall capacity is maximized.

Consider an orthogonal frequency division multiplexed (OFDM) wireless communications system with a cyclic prefix such that a linear model for a received signal at a MS is expressible as $$Y_{t,f} = \sqrt{\frac{P}{2}} \cdot H_{t,f} \cdot U \cdot s + n,$$

where Y is the received signal, $$H_{t,f} = \begin{bmatrix} h_1^H(t, f) \\ h_2^H(t, f) \end{bmatrix}$$

represents the channel response at time t and sub-carrier f, $U = [u_1 \ u_2]$ is the precoding matrix comprised of two beamforming vectors $u_1$ and $u_2$, each with unit norm, $s = [s_1 \ s_2 \ldots s_m]^T$ are the vector of transmitted symbols $E[|s_1|^2] = E[|s_2|^2] = 1$, $n \sim N(0, \sigma^2 I_M)$ is the vector of additive Gaussian noise and P is the total transmit power and is expressible as $E[x^H x] \leq P$.

Figure 5A:
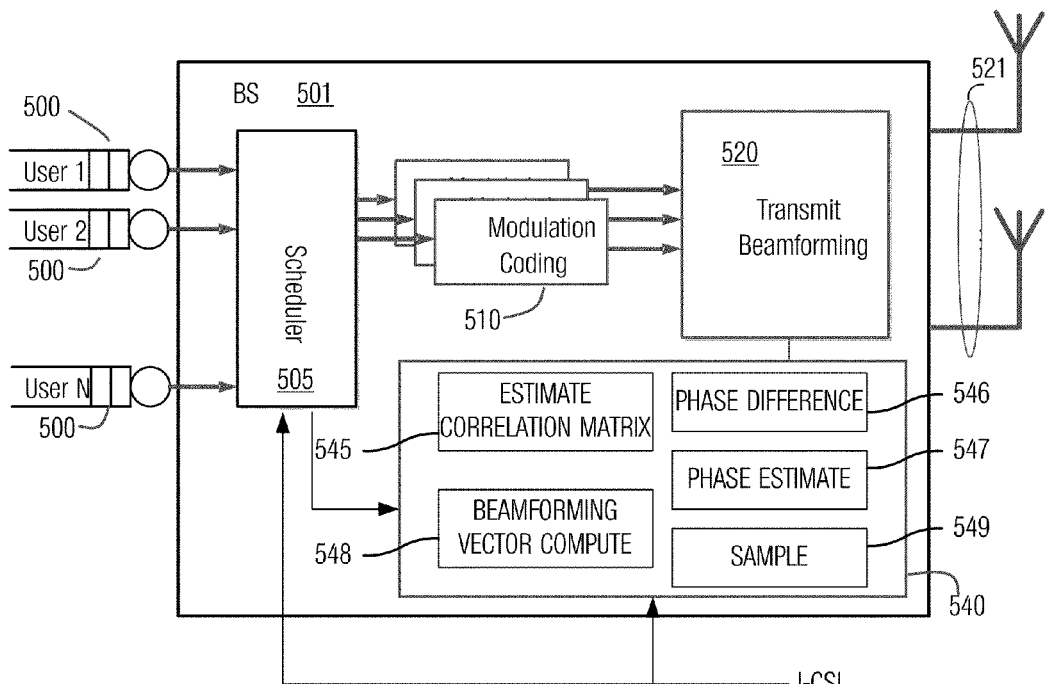
FIG. 5a is a diagram of a BS that makes use of channel statistics to compute beamforming vectors.

FIG. 5a illustrates a BS 501 that makes use of channel statistics to compute beamforming vectors. Data 500 destined for a plurality of MSs being served by BS 501, in the form of bits, symbols, or packets, for example, may be sent to a scheduler 505, which may decide which UEs will transmit or receive in a given time/frequency opportunity. Scheduler 505 may use any of a wide range of known scheduling disciplines in the literature including round robin, maximum sum rate, proportional fair, minimum remaining processing time, or maximum weighted sum rate. Generally scheduling decisions are based on channel quality information feedback (in the form of channel quality indicators or other short term information, for example) feedback from a plurality of MSs.

Data from MSs selected for transmission may be processed by a modulation and coding block 510 to convert the data to transmitted symbols. Modulation and coding block 510 may also add redundancy for the purpose of assisting with error correction and/or error detection. A modulation and coding scheme implemented in modulation and coding block 510 may be chosen based in part on information about the channel quality information feedback (in the form of channel quality indicators or other short term information).

The output of modulation and coding block 510 may be passed to a transmit beamforming block 520, which maps the output (a modulated and coded stream for each MS) onto a beamforming vector. The beamformed outputs may be coupled to antennas 521 through RF circuitry, which are not shown. Although shown in FIG. 5a as having only two antennas, it should be understood that BS 501 may have any number of antennas. The transmit beamforming vectors are input from a beamforming vector compute block 540.

Beamforming vector compute block 540 produces beamforming vectors from the channel quality information feedback or from sounding signals received from the MSs. Due to incomplete channel state information, beamforming vector compute block 540 may make use of channel statistics recorded or computed by BS 501 as it operates, to compute additional channel state information needed to determine all of the needed transmit beamforming vectors.

Beamforming vector compute block 540 includes an estimate channel correlation matrix unit 545, a phase difference unit 546, a phase estimate unit 547, and a beamforming vector compute unit 548. Estimate channel correlation matrix unit 545 may be used to compute, record, and/or update channel statistics (such as a channel correlation matrix, an estimate of the channel correlation matrix, elements of the channel correlation matrix, or estimates of elements of the channel correlation matrix) based on measurements (e.g., samples) of a sounding signal transmitted by the MSs. The channel statistics may be used to supplement the incomplete channel state information (I-CSI) received by BS 501.

Phase difference unit 546 may be used to compute a phase difference between two correlated antennas or two correlated antenna pairs. Phase difference unit 546 may make use of channel statistics, such as channel correlation matrices, estimates of channel correlation matrices, elements of channel correlation matrices, or estimates of elements of channel correlation matrices, produced by estimate channel correlation matrix unit 545. The phase difference may be used to determine the beamforming directions (beamforming vectors) $u_1$ and $u_2$.

Similarly, phase estimate unit 547 may be used to compute a phase of each correlated antenna pair. Again, phase estimate unit 547 may make use of channel statistics, such as channel correlation matrices, estimates of channel correlation matrices, elements of channel correlation matrices, or estimates of elements of channel correlation matrices, produced by estimate channel correlation matrix unit 545. The phase of each correlated antenna pair may be used to determine the beamforming directions (beamforming vectors) $u_1$ and $u_2$.

Beamforming vector compute unit 548 may compute the beamforming directions (beamforming vectors) $u_1$ and $u_2$. Beamforming vector compute unit 548 may directly compute some of the transmit beamforming vectors from the CSI feedback by the MSs. For example, referencing FIG. 4, beamforming vector compute unit 548 may be able to compute beamforming vector $w_1$ from channel state information provided regarding the channel represented by arrowed line 425.

However, beamforming vector compute block 548 may also be able to compute beamforming vectors from the phase difference between correlated antennas (from phase difference unit 546) or the phase of the correlated antennas (from phase estimate unit 547). Sample unit 549 may be used to take time-frequency samples of channels with complete channel state information for use in the selection of beamforming vectors using channel statistics.

Figure 5B:
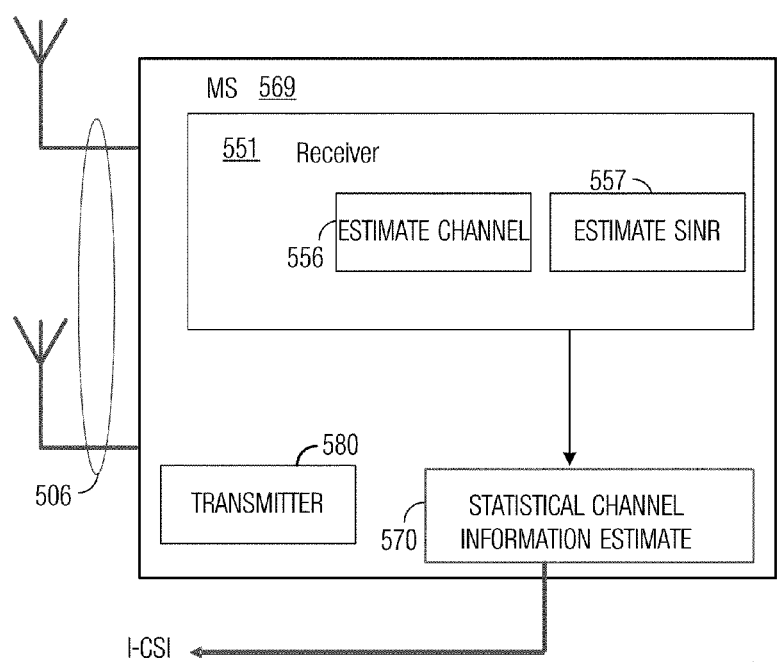
FIG. 5b is a diagram of a MS that provides channel information feedback to a BS in the form of channel state information.

FIG. 5b illustrates a MS 569 that provides channel information feedback to a BS in the form of channel state information. MS 569 may have one or a plurality of receive antennas 506, connecting through RF circuitry (not shown) to a receiver signal processing block 551. Although the antennas of the MS may have different polarizations, operability of the embodiments presented herein does not rely on the polarization of antennas of the MS. Some of the key functions performed by receiver signal processing block 551 may be channel estimation block 556 and estimate signal-to-interference-plus-noise ratio (SINR) block 557. Channel estimation block 556 uses information inserted into the transmit signal in the form of training signals, training pilots, or a structure in the transmitted signal such as cyclostationarity to estimate coefficients of the channel between BS 501 and MS 569, i.e., perform channel estimation.

The output of channel estimation block 556 (channel state information, for example) may be provided to statistical channel information estimate block 570, which may estimate the statistical channel information from the output of channel estimation block 556. The statistical channel information (estimated) may be feedback to BS 501 to be used to aid scheduling and transmit beamforming, for example. Prior to feeding back the statistical channel information, the statistical channel information may be quantized to reduce the amount of information being feedback. According to an embodiment, channel estimation block 556 may also perform an estimation of the statistical channel information, eliminating a need for statistical channel information estimate block 570.

The feedback of the statistical channel information may only be required in a frequency division duplexing (FDD) communications system, wherein a BS may not be capable of computing statistical channel information on its own using channel reciprocity. In a time-division duplexing (TDD) communications system, the BS may be able to directly acquire channel information through channel reciprocity and compute statistical channel information on its own. Therefore, a MS, such as MS 569, may not need to measure a channel and compute estimates and/or statistical channel information.

MS 569 may also include a transmitter 580 coupled to one or more transmit antennas 506 that may be used to transmit a sounding reference signal that may be used by BS 501 to compute estimates of UL communications between MS 569 and BS 501. Although MS 569 may have multiple transmit antennas, generally, MS 569 may have more receive antennas than transmit antennas.

FIG. 6a illustrates a flow diagram of BS operations 600 in communicating with incomplete channel state information. BS operations 600 may be indicative of operations occurring in a BS, such as BS 501, as the BS communicates to a MS, such as MS 569, using spatial multiplexing. The BS may make use of a sounding signal transmitted by the MS to obtain channel state information about communications channels between the MS and itself. However, the MS may have more receive antennas than transmit antennas, therefore the BS may not be able to obtain complete channel information (such as statistical channel information) about the communications channels. The BS may make use of channel statistics, from measurements or historical information that it has recorded itself, to supplement the I-CSI. BS operations 600 may occur while the BS and the MS are in normal operations and are communicating using spatial multiplexing.

It is widely known that it is possible to estimate the beamforming directions (beamforming vectors) $u_1$ and $u_2$ at a BS for the downlink channel based on measurements of a sounding signal provided by a MS. However, since the MS has more receive antennas than transmit antennas, uplink channel statistics are not available for all channels. For a communications system, such as one shown in FIG. 4, let antenna pair #1 and #3 have similar polarization and antenna pair of antennas #2 and #4 have similar polarization, meaning that antenna pair of antennas #1 and #3 and antenna pair of antennas #2 and #4 may be correlated (they each may form a 2×1 linear array, but the two sets of antenna pairs are not necessarily correlated due to their different polarizations).

BS operations 600 may begin with the BS receiving a sounding reference signal transmitted by the MS (block 605). The sounding reference signal may be a reference sequence unique to the MS that is periodically transmitted by the MS to allow a receiver of the transmission, e.g., the BS, to determine channel information (e.g., statistical channel information) of a communications channel between the BS and itself, i.e., an UL communications channel. Furthermore, in TDD communications systems, channel reciprocity may be used to determine channel information regarding a DL communications channel between the receiver and the MS without having to have the MS transmit the sounding reference signal.

The BS may use the received sounding reference signal to compute an estimate of a channel for a first antenna pair $h_{13}$ (block 610). According to an embodiment, $$h_{13} = \begin{bmatrix} h_1(1) \\ h_1(3) \end{bmatrix},$$

where $h_1(1)$ is a channel between antenna #1 of the BS and antenna #1 of the MS and $h_1(3)$ is a channel between antenna #3 of the BS and antenna #1 of the MS. The BS may also compute an estimate of a channel for a second antenna pair $h_{24}$ (block 615). According to an embodiment, $$h_{24} = \begin{bmatrix} h_1(2) \\ h_1(4) \end{bmatrix},$$

where $h_1(2)$ is a channel between antenna #2 of the BS and antenna #1 of the MS and $h_1(4)$ is a channel between antenna #4 of the BS and antenna #1 of the MS.

From the computed estimates of channels for the first antenna pair $h_{13}$ and the second antenna pair $h_{24}$, the BS may compute channel correlation matrices for the channels for the first antenna pair $R_{13}$ and the second antenna pair $R_{24}$. According to an embodiment, the BS may not need to actually compute the channel correlation matrices for the channels for the first antenna pair $R_{13}$ and the second antenna pair $R_{24}$ using expressions $$R_{13} = E[h_{13} h_{13}^H],$$

and $$R_{24} = E[h_{24} h_{24}^H],$$

where E[ ] is an expected value function. Instead, only certain off-diagonal elements of the channel correlation matrices may be needed and therefore computed (block 620). It may be possible to estimate these off-diagonal elements.

According to an embodiment, the estimates of off-diagonal elements of the channel correlation matrices for the channels for the first antenna pair $R_{13}$ and the second antenna pair $R_{24}$ may be computed using expressions $$R_{13}^{(t)}(1,2) = \frac{1}{|\Omega|} \sum_{f \in \Omega} h_1^{(t,f)}(1) \cdot \left(h_1^{(t,f)}(3)\right)^*$$

and $$R_{24}^{(t)}(1,2) = \frac{1}{|\Omega|} \sum_{f \in \Omega} h_1^{(t,f)}(2) \cdot \left(h_1^{(t,f)}(4)\right)^*,$$

where ( )* is a conjugation operator, t is a time index of the sounding symbol, Q is a set of indices of sounding subcarriers in a t-th sounding symbol, $|\Omega|$ is a total number of sounding subcarriers, and f is a time-frequency index of sounding subcarriers within the t-th sounding symbol.

The techniques for computing of the beamforming vectors $u_1$ and $u_2$ presented herein rely on second order statistics of DL channels (e.g., the channel correlation matrices, estimates of the channel correlation matrices, elements of the channel correlation matrices, estimates of the elements of the channel correlation matrices, and so on) instead of instantaneous information (e.g., CSI) that may not be accurate or available, for example, due to a MS having more receive antennas than transmit antennas. The techniques presented herein do not require the forming of correlation matrices or solving eigen problems. Instead, only estimates of a cross-correlation of antenna pairs (antennas #1 and #3 and antennas #2 and #4, respectively) are needed.

In case the sounding signal continues in time, it may be possible to use temporal averaging to smooth out estimated values of the cross-correlations for the two antenna pairs. According to an embodiment, exponential averaging filtering may be used. Exponential averaging of the estimate values may be expressed as $$\overline{R}_{13}^{(t)}(1,2) = \beta \cdot \overline{R}_{13}^{(t-1)}(1,2) + (1-\beta) \cdot R_{13}^{(t)}(1,2)$$

and $$\overline{R}_{24}^{(t)}(1,2) = \beta \cdot \overline{R}_{24}^{(t-1)}(1,2) + (1-\beta) \cdot R_{24}^{(t)}(1,2),$$

where $\beta$ is a filter coefficient. The filtering may alternatively make use of an infinite impulse response (IIR), finite impulse response (FIR), or other types of filters. According to an embodiment, $\beta$ may be optimally adapted to a Doppler frequency of each MS. As an example, $\beta$ may be set to 31/32, 15/16, and 7/8 for low mobility (3 Km/h to 10 Km/h), medium mobility (10 Km/h to 30 Km/h), and high mobility (30 Km/h to 120 Km/h) MSs, respectively. Actual values of $\beta$ may be adjusted based on performance evaluation, simulation, and so forth.

However, if the antenna spacing D is small, e.g., $\lambda/2$, where $\lambda$ is the wavelength, then a spatial correlation structure of antenna pair of antennas #1 and #3 and antenna pair of antennas #2 and #4 may be very similar and may be determined by a location of the scatterers. Therefore, $R_{13} \approx R_{24}$.

The BS may compute beamforming vectors $u_1$ and $u_2$ based on the channel correlation matrices for the channels for the first antenna pair $R_{13}$ and the second antenna pair $R_{24}$ (block 625). According to an embodiment, the channel correlation matrices for the channels for the first antenna pair $R_{13}$ and the second antenna pair $R_{24}$ may be used to estimate a phase of the two antenna pairs or a phase difference between the two antenna pairs, which may then be used to compute the beamforming vectors $u_1$ and $u_2$. A detailed discussion of computing the beamforming vectors $u_1$ and $u_2$ based on the estimated phase and estimated phase difference for the two antenna pairs is provided below.

With the beamforming vectors $u_1$ and $u_2$ computed, the BS may use the beamforming vectors to beamform a transmission to the MS (block 630) and BS operations 600 may then terminate.

FIG. 6b illustrates a flow diagram of MS operations 650 in communicating with incomplete channel state information. MS operations 650 may be indicative of operations occurring in a MS, such as MS 569, as the MS communicates with a BS, such as BS 501, using spatial multiplexing. MS operations 650 may occur while the MS and the BS are in normal operations and are communicating using spatial multiplexing.

MS operations 650 may begin with the MS transmitting a sounding reference signal to the BS (block 655). The sounding reference signal may be a reference sequence unique to the MS that is periodically transmitted by the MS to allow a receiver of the transmission, e.g., the BS, to determine channel state information of a communications channel between the MS and itself, i.e., an UL communications channel. Furthermore, in TDD communications systems, channel reciprocity may be used to determine channel state information regarding a DL communications channel between the receiver and the MS.

The MS may then receive a transmission from the BS, wherein the transmission has been beamformed with beamforming vectors computed based on the sounding reference signal and selected using channel statistics (block 660). Some of the beamforming vectors may be directly computed based on the sounding reference signal, while some of the beamforming vectors may be selected using channel statistics determined by the BS. MS operations 650 may then terminate.

Figure 7A:
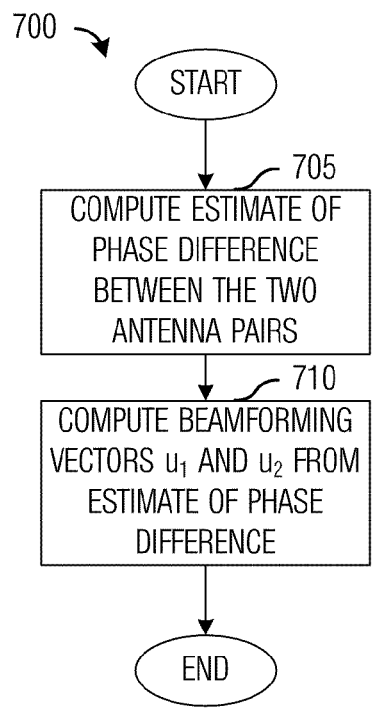
FIG. 7a is a flow diagram of BS operations in computing beamforming vectors from an estimate of phase difference.

FIG. 7a illustrates a flow diagram of BS operations 700 in computing beamforming vectors from an estimate of phase difference. BS operations 700 may be indicative of operations in a BS, such as BS 501, as the BS computes beamforming vectors from an estimate of phase difference between two antenna pairs, wherein the two antenna pairs are cross-polarized. BS operations 700 may occur while the BS is in a normal operating mode and while the BS has information to transmit to a MS. BS operations 700 may be an implementation of compute beamforming vectors $u_1$ and $u_2$, block 625 of FIG. 6a.

BS operations 700 may begin with the BS computing an estimate of a phase difference between the two antenna pairs (block 705). According to an embodiment, the BS may be able to estimate a channel correlation matrix from noisy channel samples by averaging two correlation matrices, e.g., the channel correlation matrices for the channels for the first antenna pair $R_{13}$ and the second antenna pair $R_{24}$. The estimation of the channel correlation matrix may be expressed as $$\overline{R} = \frac{\overline{R}_{13} + \overline{R}_{24}}{2}.$$

In order to estimate the phase difference between the two antenna pairs, it may be necessary to find a vector $$e = \begin{bmatrix} 1 \\ e^{j\theta} \end{bmatrix}$$

such that $e^{H} \cdot \overline{R} \cdot e$ is maximized. According to an embodiment, $e^{H} \cdot \overline{R} \cdot e$ may be maximized when $$e^{j\theta} = \frac{(\overline{R}(1,2))^*}{|\overline{R}(1,2)|},$$

where $\overline{R}(1,2)$ indicates to a first row and a second column of $\overline{R}$.

The BS may compute the beamforming vectors $u_1$ and $u_2$ from the estimated phase difference between the two antenna pairs (block 710). According to an embodiment, the beamforming vectors $u_1$ and $u_2$ may be expressed as $$u_1 = \left(\frac{1}{\sqrt{2}}\right) \begin{bmatrix} 1 \\ 0 \\ e^{j\theta} \\ 0 \end{bmatrix}$$

and $$u_2 = \left(\frac{1}{\sqrt{2}}\right) \begin{bmatrix} 0 \\ 1 \\ 0 \\ e^{j\theta} \end{bmatrix}.$$

BS operations 700 may then terminate.

Figure 7B:
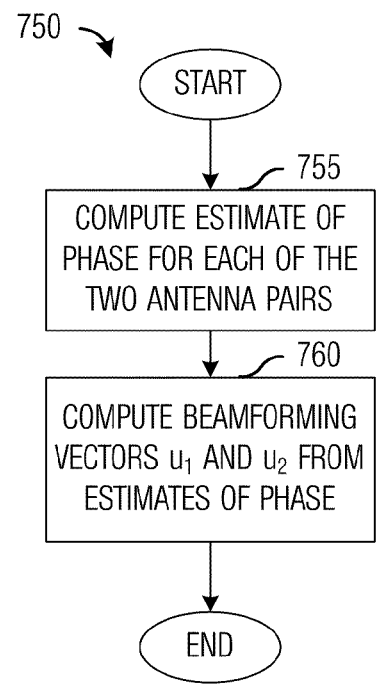
FIG. 7b is a flow diagram of BS operations in computing beamforming vectors from estimates of phases.

FIG. 7b illustrates a flow diagram of BS operations 750 in computing beamforming vectors from estimates of phases. BS operations 750 may be indicative of operations in a BS, such as BS 501, as the BS computes beamforming vectors from estimates of phases of two antenna pairs, wherein the two antenna pairs are cross-polarized. BS operations 750 may occur while the BS is in a normal operating mode and while the BS has information to transmit to a MS. BS operations 750 may be an implementation of compute beamforming vectors $u_1$ and $u_2$, block 625 of FIG. 6a.

BS operations 750 may begin with the BS computing estimates of phases for the two antenna pairs (block 755). According to an embodiment, the estimate of a phase for the first antenna pair (antennas #1 and #3 of the BS) may be expressible as $$e^{j\theta_{13}} = \frac{(\overline{R}_{13}(1,2))^*}{|\overline{R}_{13}(1,2)|},$$

while the estimate of a phase for the second antenna pair (antennas #2 and #4 of the BS) may be expressible as $$e^{j\theta_{24}} = \frac{(\overline{R}_{24}(1,2))^*}{|\overline{R}_{24}(1,2)|}.$$

The BS may compute the beamforming vectors $u_1$ and $u_2$ from the estimated phases for the two antenna pairs (block 760). According to an embodiment, the beamforming vectors $u_1$ and $u_2$ may be expressed as $$u_1 = \left(\frac{1}{\sqrt{2}}\right)\begin{bmatrix} 1 \\ 0 \\ e^{j\theta_{13}} \\ 0 \end{bmatrix}$$

and $$u_2 = \left(\frac{1}{\sqrt{2}}\right)\begin{bmatrix} 0 \\ 1 \\ 0 \\ e^{j\theta_{24}} \end{bmatrix}.$$

BS operations 750 may then terminate.

Figure 8:
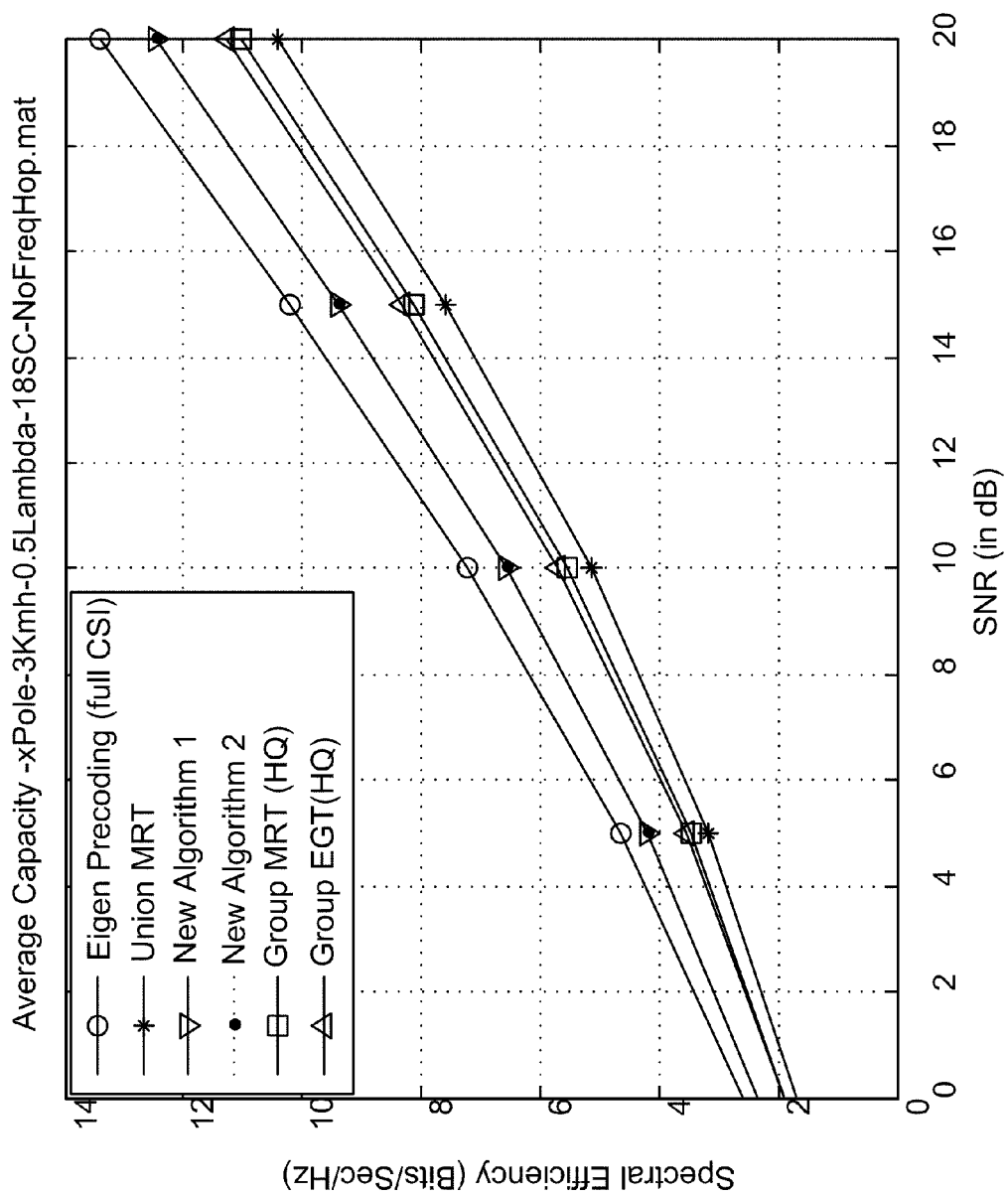
FIGS. 8 and 9 are plots of spectral efficiency versus signal to noise ratio for a communications system comparing a variety of techniques for computing beamforming vectors with random frequency hopping on and off, respectively.
Figure 9:
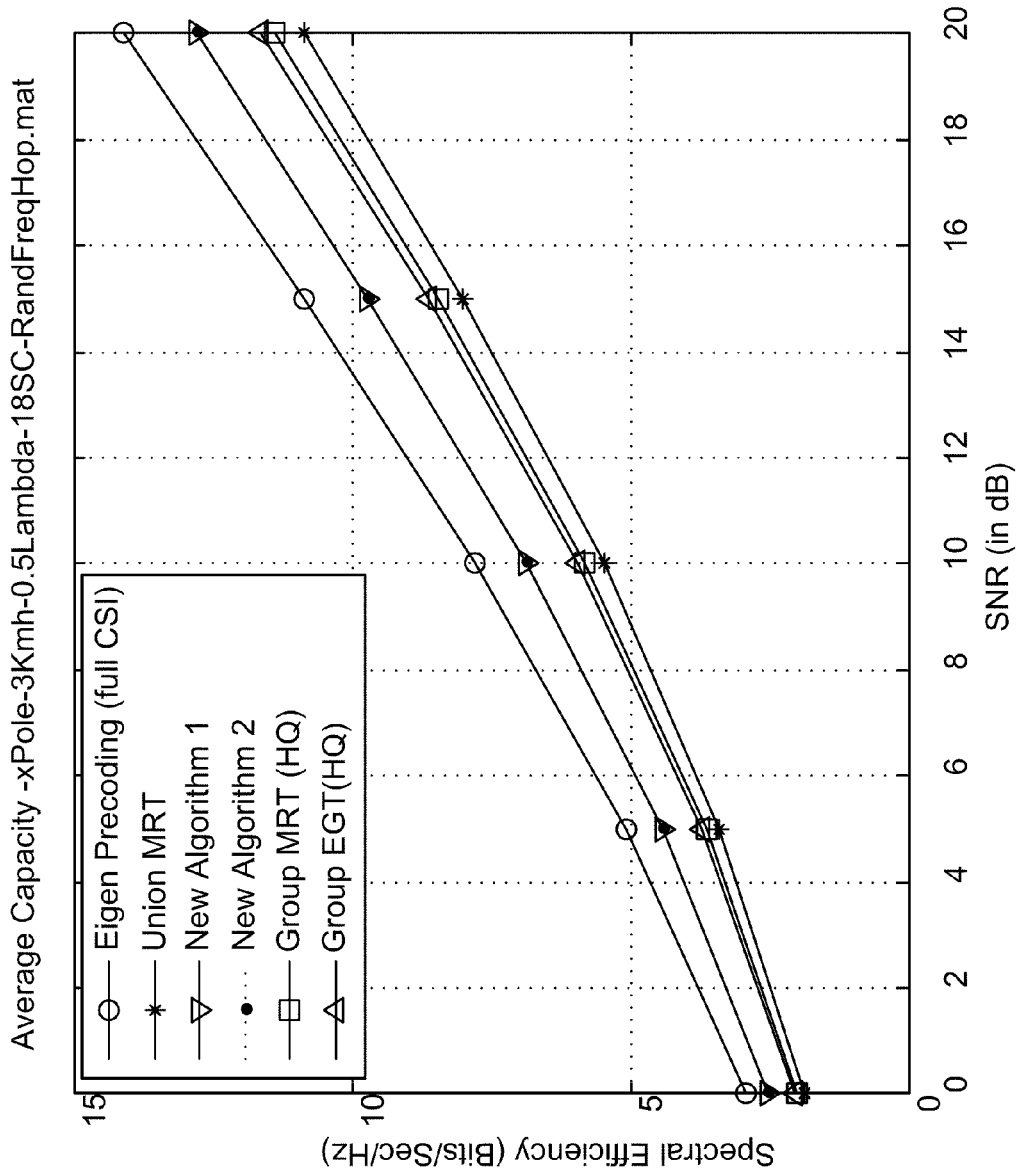

FIGS. 8 and 9 illustrate plots of spectral efficiency versus signal to noise ratio for a communications system comparing a variety of techniques for computing beamforming vectors with random frequency hopping on and off, respectively. The techniques for computing beamforming vectors range from eigen value precoding (a full CSI technique), to Union MRT (an I-CSI technique using channel statistics to estimate beamforming vector direction), to the techniques presented herein (I-CSI techniques using channel statistics to estimate phase differences and phases of antenna pairs) labeled as "New Algorithm 1" and "New Algorithm 2." As shown in FIGS. 8 and 9, the full CSI technique provides the best performance over all SNR values. However, the techniques presented herein provide substantially equal performance and were better than other non-full CSI techniques.

Although the embodiments and their advantages have been described in detail, it should be understood that various changes, substitutions and alterations can be made herein without departing from the spirit and scope of the invention as defined by the appended claims Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for wireless communications, the method comprising:

receiving, at a controller, a reference signal transmitted by a communications device, wherein the reference signal is transmitted using a subset of antennas used for data reception at the communications device, wherein the controller and the communications device utilize cross-polarized antennas, wherein the reference signal comprises incomplete channel state information;

computing channel statistics based on the reference signal;

computing a first beamforming vector and a second beamforming vector, wherein the computing is based on the channel statistics; and transmitting information to the communications device, wherein the transmitting uses the first beamforming vector and the second beamforming vector, wherein the first beamforming vector precodes information for a first antenna at the communications device, and wherein the second beamforming vector precodes information for a second antenna at the communications device.

2. The method of claim 1, wherein computing channel statistics comprises:

computing a first channel estimate corresponding to antennas at the controller having a first polarization; and computing a second channel estimate corresponding to antennas at the controller having a second polarization.

3. The method of claim 2, wherein computing a first channel estimate comprises:

sampling a first channel between a first antenna having the first polarization at the controller and one of the antennas at the communications device;

sampling a second channel between a second antenna having the first polarization at the controller and the one of the antennas at the communications device; and evaluating $$h_{13} = \begin{bmatrix} h_1(1) \\ h_1(3) \end{bmatrix},$$

where $h_1(1)$ is a vector of samples of the first channel between the first antenna having the first polarization at the controller and the one of the antennas at the communications device and $h_1(3)$ is a vector of samples of the second channel between the second antenna having the first polarization at the controller and the one of the antennas at the communications device.

4. The method of claim 2, wherein computing a second channel estimate comprises:

sampling a third channel between a first antenna having the second polarization at the controller and one of the antennas at the communications device;

sampling a fourth channel between a second antenna having the second polarization at the controller and the one of the antennas at the communications device; and evaluating $$h_{24} = \begin{bmatrix} h_1(2) \\ h_1(4) \end{bmatrix}$$

where $h_1(2)$ is a vector of samples of the channel between the first antenna having the second polarization at the controller and the one of the antennas at the communications device and $h_1(4)$ is a vector of samples of the channel between the second antenna having the second polarization at the controller and the one of the antennas at the communications device.

5. The method of claim 2, wherein computing channel statistics further comprises:

computing an estimate of elements of a first channel correlation matrix corresponding to antennas at the controller having the first polarization; and computing an estimate of elements of a second channel correlation matrix corresponding to antennas at the controller having the second polarization.

6. The method of claim 5, wherein the reference signal comprises a plurality of sounding symbols, and wherein computing an estimate of elements of a first channel correlation matrix comprises evaluating $$R_{13}^{(t)}(1,2) = \frac{1}{|\Omega|} \sum_{f \in \Omega} h_1^{(t,f)}(1) \cdot \left(h_1^{(t,f)}(3)\right)^*,$$

where ( )* is a conjugation operator, $\Omega$ is a set of indices of sounding subcarriers in a sounding symbol t, $|\Omega|$ is a total number of sounding subcarriers, t is a time index of the sounding symbol, $h_1(1)$ is a channel between the first antenna having the first polarization at the controller and one of the antennas at the communications device, and $h_1(3)$ is a channel between the second antenna having the first polarization at the controller and the one of the antennas at the communications device.

7. The method of claim 6, wherein computing an estimate of elements of a first channel correlation matrix further comprises filtering the estimate of elements of the first channel correlation matrix.

8. The method of claim 5, wherein the reference signal comprises a plurality of sounding symbols, and wherein computing an estimate of elements of a second channel correlation matrix comprises evaluating $$R_{24}^{(t)}(1,2) = \frac{1}{|\Omega|} \sum_{f \in \Omega} h_1^{(t,f)}(2) \cdot \left(h_1^{(t,f)}(4)\right)^*,$$

where ( )* is a conjugation operator, t is a time index of the sounding symbol, $\Omega$ is a set of indices of sounding subcarriers in a t-th sounding symbol, $|\Omega|$ is a total number of sounding subcarriers, f is a time-frequency index of sounding subcarriers within the t-th sounding symbol, $h_1(2)$ is a channel between the first antenna having the second polarization at the controller and one of the antennas at the communications device, and $h_1(4)$ is a channel between the second antenna having the second polarization at the controller and the one of the antennas at the communications device.

9. The method of claim 8, wherein computing an estimate of elements of a second channel correlation matrix further comprises filtering the estimate of elements of the second channel correlation matrix.

10. The method of claim 9, wherein filtering the estimate of elements of the second channel correlation matrix comprises applying an exponential filter, a finite impulse response filter, an infinite impulse response filter, or a combination thereof.

11. The method of claim 8, wherein the elements of the second channel correlation matrix comprises off-diagonal elements of the second channel correlation matrix.

12. The method of claim 1, wherein computing a first beamforming vector and a second beamforming vector comprises computing the first beamforming vector and the second beamforming vector based on a phase difference between antennas having a first polarization and antennas having a second polarization.

13. The method of claim 12, wherein the first beamforming vector is expressible as $$u_1 = \left(\frac{1}{\sqrt{2}}\right) \begin{bmatrix} 1 \\ 0 \\ e^{j\theta} \\ 0 \end{bmatrix},$$

and the second beamforming vector is expressible as $$u_2 = \left(\frac{1}{\sqrt{2}}\right) \begin{bmatrix} 0 \\ 1 \\ 0 \\ e^{j\theta} \end{bmatrix},$$

where $$e^{j\theta} = \frac{(\overline{R}(1,2))^*}{|\overline{R}(1,2)|}, \overline{R} = \frac{\overline{R}_{13} + \overline{R}_{24}}{2},$$

and $\overline{R}(x,y)$ indicates to a x-th row and a y-th column of $\overline{R}$.

14. The method of claim 1, wherein computing a first beamforming vector and a second beamforming vector comprises computing the first beamforming vector and the second beamforming vector based on a phase of antennas having a first polarization and a phase of antennas having a second polarization.

15. The method of claim 14, wherein the first beamforming vector is expressible as $$u_1 = \left(\frac{1}{\sqrt{2}}\right) \begin{bmatrix} 1 \\ 0 \\ e^{j\theta_{13}} \\ 0 \end{bmatrix},$$

and the second beamforming vector is expressible as $$u_2 = \left(\frac{1}{\sqrt{2}}\right) \begin{bmatrix} 0 \\ 1 \\ 0 \\ e^{j\theta_{24}} \end{bmatrix},$$

where $$e^{j\theta_{13}} = \frac{(\overline{R}_{13}(1,2))^*}{|\overline{R}_{13}(1,2)|}, e^{j\theta_{24}} = \frac{(\overline{R}_{24}(1,2))^*}{|\overline{R}_{24}(1,2)|}, \overline{R} = \frac{\overline{R}_{13} + \overline{R}_{24}}{2},$$

and $\overline{R}_{wz}(x,y)$ indicates to a x-th row and a y-th column of $\overline{R}_{wz}$.

16. A method for wireless communications, the method comprising:
transmitting a reference signal using a subset of antennas used for receiving information to a controller, wherein the reference signal comprises incomplete channel state information; and
receiving information from the controller, wherein the information is precoded using a first beamforming vector and a second beamforming vector, wherein the information precoded by the first beamforming vector is received by a first antenna, wherein the information precoded by the second beamforming vector is received by a second antenna, and wherein the first beamforming vector and the second beamforming vector are computed from estimates of statistical channel information.

17. The method of claim 16, wherein the first beamforming vector and the second beamforming vector are each based on time-frequency samples of a communications channel between the subset of antennas and the controller.

18. The method of claim 17, wherein the first beamforming vector and the second beamforming vector are each based on estimated phases of a first subset of antennas at the controller and a second subset of antennas at the controller.

19. The method of claim 18, wherein the first beamforming vector and the second beamforming vector are based on an estimated phase difference between the first subset of antennas at the controller and the second subset of antennas at the controller.

20. A communications controller comprising:
a receiver configured to receive a reference signal transmitted by a communications device, wherein the communications device transmits with a subset of antennas used for receiving information, wherein the reference signal comprises incomplete channel state information;
a beamforming vector compute unit coupled to the receiver, the beamforming vector compute unit configured to compute beamforming vectors for a communications device based on estimates of elements of correlation matrices for antennas in the subset of antennas based on a transmission of the reference signal by the communications device; and
a beamforming unit coupled to the receiver and to the beamforming vector compute unit, the beamforming unit configured to precode data to be transmitted to the communications device with the beamforming vectors computed by the beamforming vector compute unit for the communications device.

21. The communications controller of claim 20, wherein the beamforming vector compute unit comprises:
a correlation estimate unit configured to estimate elements of a correlation matrix based on measurements of a reference signal received at the receiver;
a phase difference unit coupled to the correlation estimate unit, the phase difference unit configured to estimate a phase difference between antennas in the at least one pair of cross-polarized antennas based on the estimated elements of the correlation matrix;
a phase estimate unit coupled to the correlation estimate unit, the phase estimate unit configured to estimate a phase of antennas in the at least one pair of cross-polarized antennas based on the estimated elements of the correlation matrix; and
a second beamforming vector compute unit coupled to the phase difference unit and to the phase estimate unit, the second beamforming vector compute unit configured to compute beamforming vectors for the at least one pair of cross-polarized antennas based on phase information provided by the phase difference unit or the phase estimate unit.

22. The communications controller of claim 20, wherein the beamforming vector compute unit further comprises a sampling unit coupled to the correlation estimate unit, the sampling unit configured to sample the reference signal.

23. The communications controller of claim 22, wherein the sampling unit is further configured to filter samples of the reference signal.

* * * * *